United States Patent Office 3,380,537
Patented Apr. 30, 1968

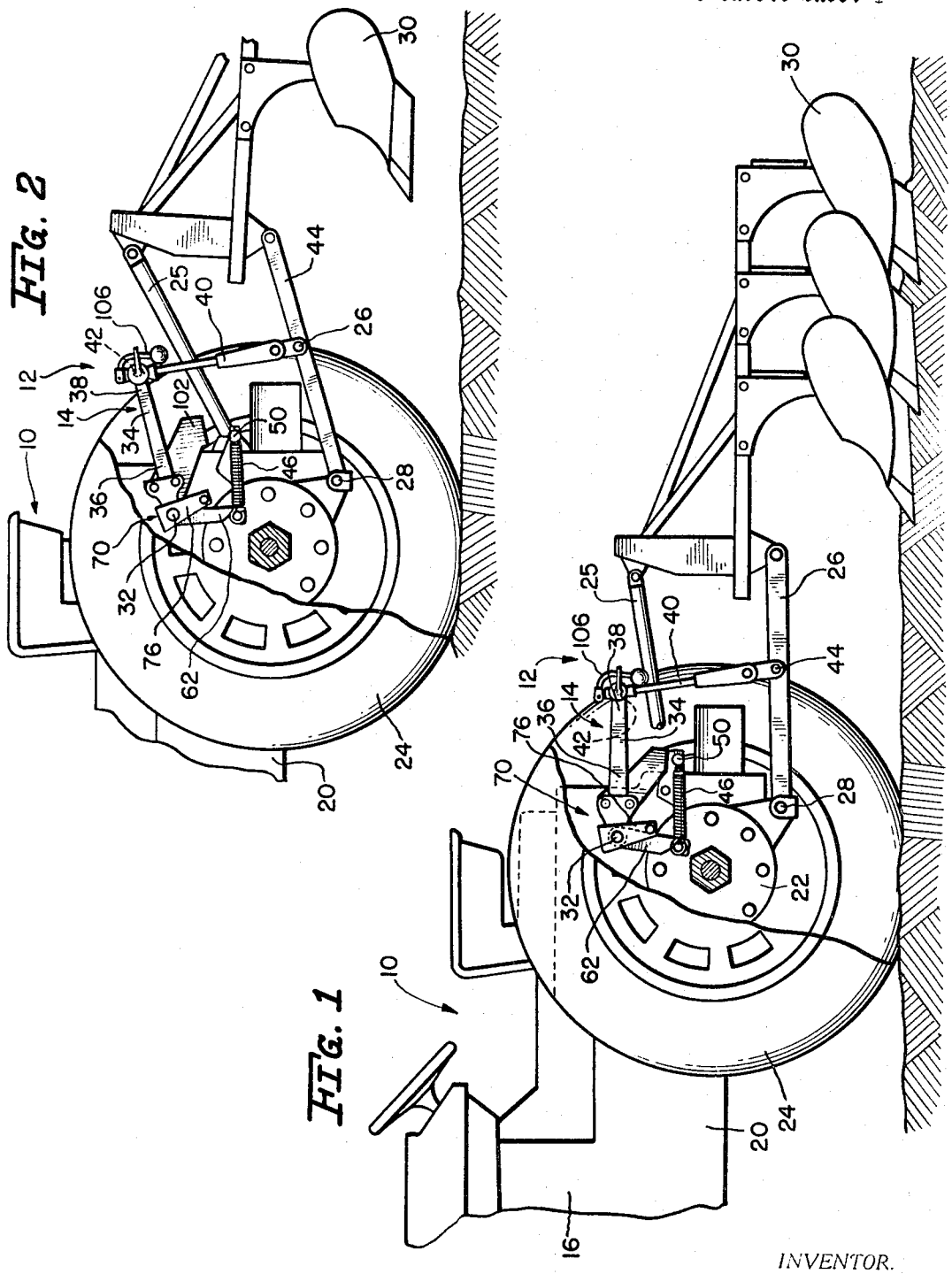

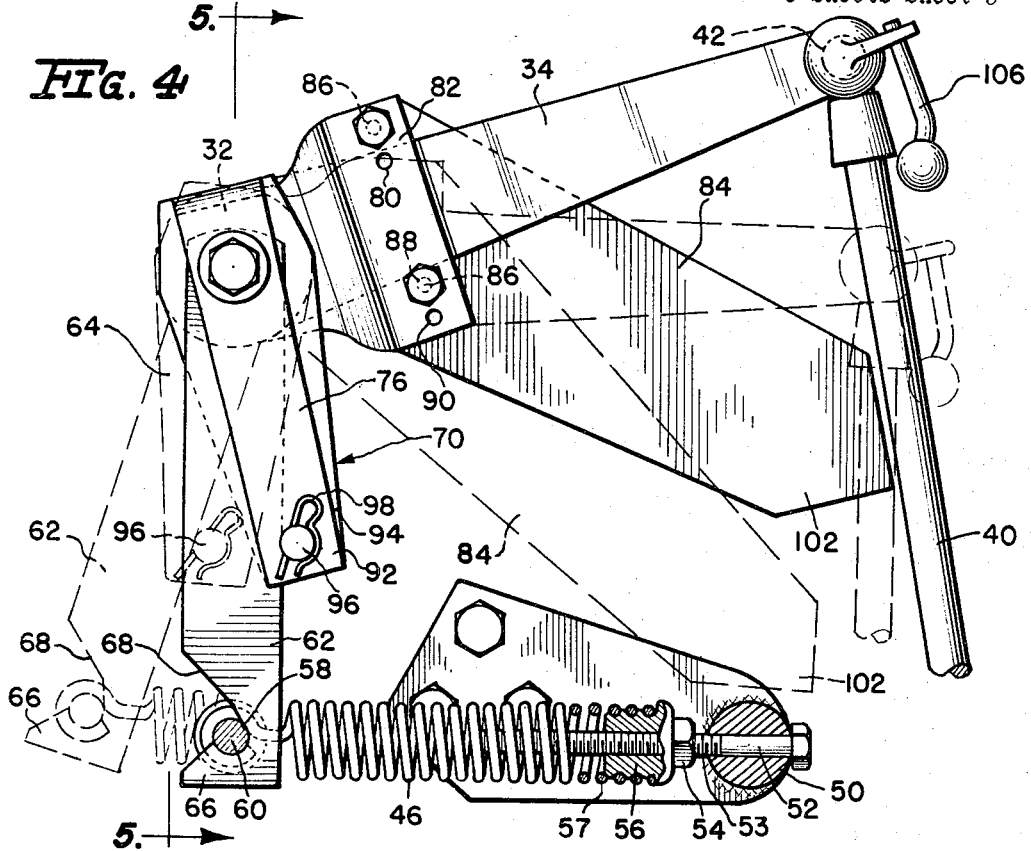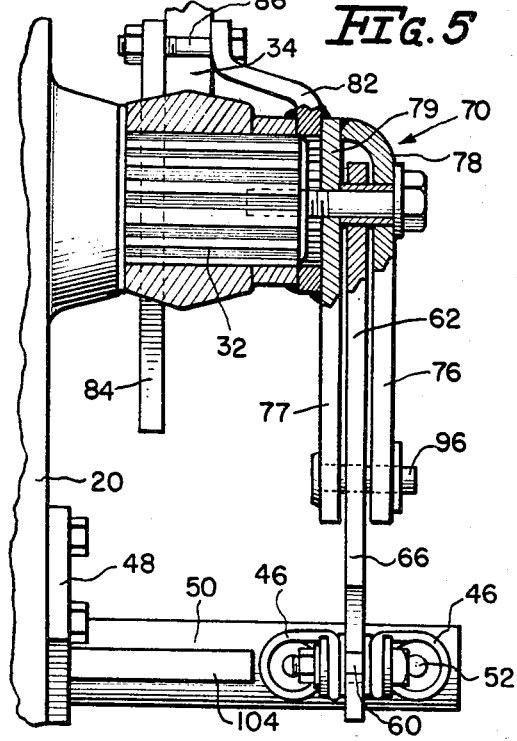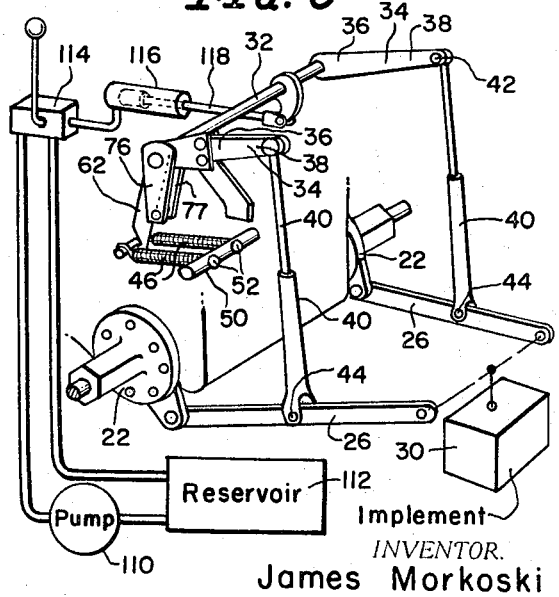

3,380,537
IMPLEMENT WEIGHT TRANSFER DEVICE
James Morkoski, Clarendon Hills, Ill., assignor to International Harvester Company, a corporation of Delaware
Filed Aug. 4, 1965, Ser. No. 477,199
12 Claims. (Cl. 172—445)

This invention relates generally to a hitch assembly for a tractor and associated implement, and more particularly relates to a hitch assembly incorporating a weight transfer device to increase traction of a tractor by transferring a part of the weight of the implement to the tractor.

When a tractor is used with plows and other agricultural implements imposing a substantial draft load on the tractor, slipping of the tractor's drive wheels on the ground may occur tending to reduce the tractor's tractive effort. As is known, the tractive effort of the tractor can be increased relatively within the limits of its available horsepower by increasing loading of the tractor on its drive wheels as by transferring a part of the weight of the implement to the tractor, thereby increasing frictional contact of the drive wheels with the ground.

The present invention relates to an improved weight transfer device which is suitable for use with hitch assemblies of conventional two or three point linkage type.

Thus, a general object of this invention is to provide and improved weight transfer device suitable for use with conventional hitch assemblies.

Another object of the invention is to provide a tractor hitch assembly weight transfer device to accomplish a relatively gradual transfer of a portion of the weight of an associated implement to the tractor rear wheels as the implement is lowered toward the ground or into the ground by the hitch assembly.

Still another object of the invention is to provide an uncomplicated and foolproof tractor-implement weight transfer device that is relatively simple to manufacture and that may be readily secured to a tractor having a conventional hitch assembly.

A further object of the invention is to provide an improved tractor hitch assembly incorporating a weight transfer device which rotates synchronously with a tractor rockshaft to effect a transfer of weight from an associated implement to the tractor drive wheels at a predetermined point of lowering of the implement.

Another object of the invention is to provide a tractor hitch assembly weight transfer device having resilient means operable upon rotation of a tractor rockshaft in lowering an associated implement to effect a gradual transfer of weight of the implement to the tractor at a predetermined operator-adjustable point of lowering of the implement.

Still another object of the invention is to provide an improved weight transfer device suitable for use with conventional tractor hitch assemblies of the two or three pivot point type with safety means to automatically stop the transfer of weight from the implement to the tractor at a predetermined point of lowering of the implement.

These and other objects of the invention will become apparent to one skilled in the art from the following specification and drawings forming a part thereof, wherein:

FIGS. 1 and 2 are somewhat simplified side elevation views of a rear end of a tractor and a hitch assembly incorporating the weight transfer device of the invention, with a portion of one tractor rear wheel removed and with an agricultural implement shown in lowered position in FIG. 1 and in raised position in FIG. 2;

FIG. 4 is a side elevational view partially in section of the weight transfer device of FIG. 3 with the weight transfer device shown in full line immediately prior to weight transfer and in dotted line with a portion of the weight of the implement transferred to the tractor;

FIG. 5 is a sectional view taken along the line 5—5 of FIG. 4;

FIG. 6 is a somewhat simplified schematic view of the hitch assembly weight transfer device of the invention including a hydraulic circuit for operation of implement lift arms.

Figure 3:
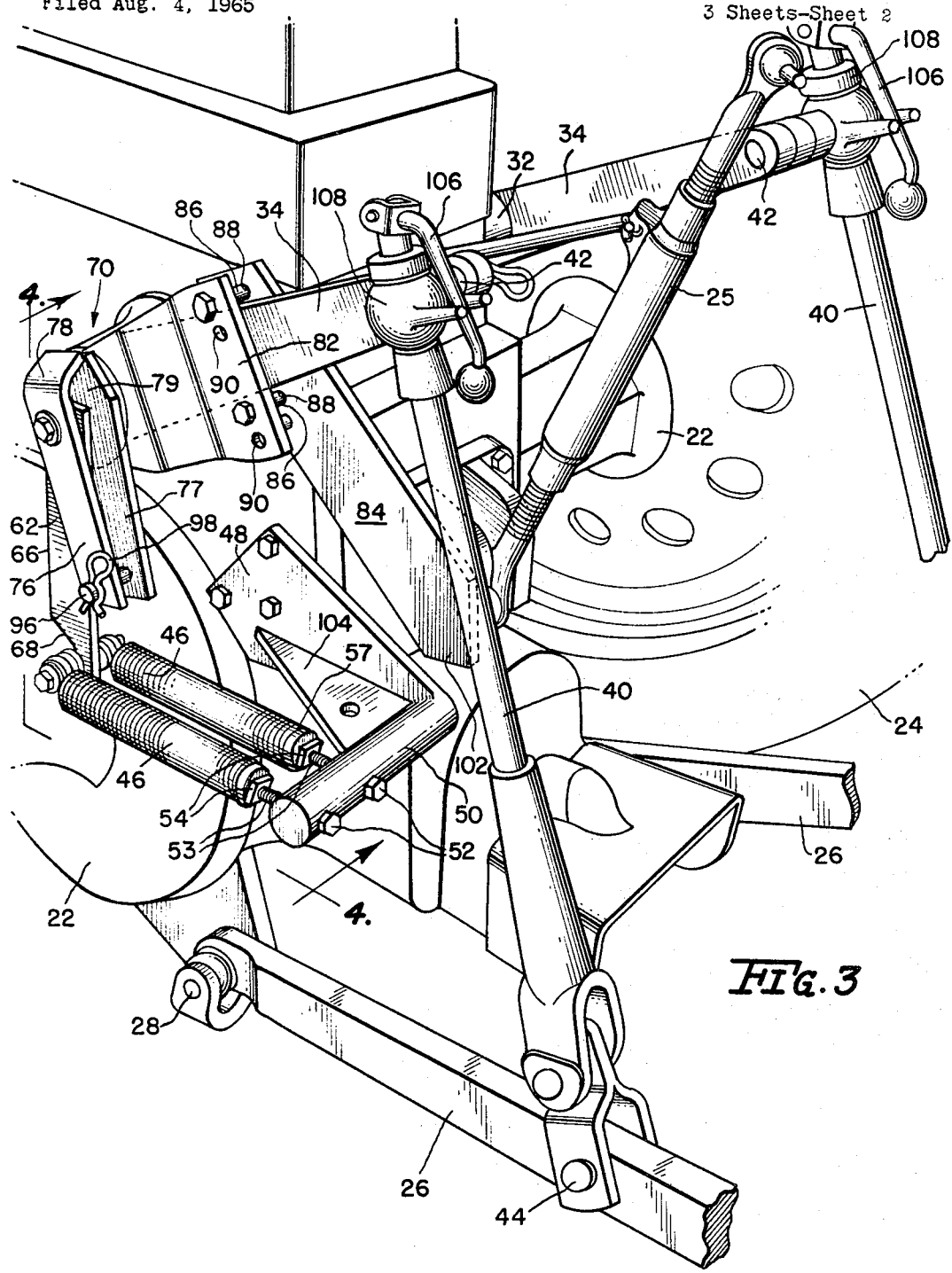
FIG. 3 is a cut away perspective view of the rear of the hitch assembly of FIGS. 1 and 2 showing the weight transfer device more clearly.

Referring now to the drawings, there is shown in FIG. 1 a tractor 10 having an implement hitch assembly 12 incorporating an improved weight transfer device constructed in accordance with the invention and designated generally by the numeral 14. The tractor 10 has a conventional longitudinally extending frame 16 including a front portion, not shown, and a rear portion 20 having a rear axle structure 22 mounted thereon including laterally spaced rear drive wheels 24.

The hitch assembly 12 may include conventional draft and position control linkage and may be of either two or three point linkage type; however, for purposes of exemplification, the invention is illustrated to be of the three point linkage type including an upper hitch link 25 and a pair of lower hitch links or implement support arms 26 which are pivotally secured to the tractor frame as at 28, the support arms being connected conventionally to a draft type implement 30 shown in FIGS. 1 and 2 as a plow.

A rotatable rockshaft 32 is rotatably mounted on the tractor extending transverse the tractor frame 16 at its rear end 20, as best seen by reference to FIGS. 5, 6. The rockshaft 32 has a pair of rearwardly extending lift means comprising a pair of rearwardly extending transversely spaced lift arms 34 having first and second ends 36, 38. The lift arms 34 are splined to the rockshaft at the first ends 36 for rotation therewith and are adapted to raise and lower the support arms by means of link arms 40 pivotally connecting the rockshaft lift arms 34 and the support arms 26 as at pivot points 42 and 44. As should be clear, rotation of the rockshaft 32 in a clockwise direction as viewed in the drawings effects a corresponding clockwise rotation of the lift arms 34 to effect a lowering of support arms 26 and the associated tractor implement 30 connected thereto. Similarly, a counterclockwise rotation of the rockshaft effects a counterclockwise rotation of lift arms 34 and a raising of the implement 30.

In accordance with the invention, resilient means are provided to resist lowering of the implement beyond a predetermined point, the resilient means comprising a pair of longitudinally extending transversely spaced springs 46 positioned on the side of the tractor frame. The springs 46 are secured to a rear portion of the tractor frame and are arranged to oppose rotation of the lift arms 34 in a clockwise direction, as viewed in the drawings, beyond a predetermined point of rotation. Rotation of the lift means in a clockwise direction to lower the implement beyond this predetermined point effects a transfer of a portion of the weight of the implement to the tractor rear end to increase loading on the rear wheels 24.

Support means are provided to support the springs for stretching movement in a direction generally parallel to the ground, the support means including a spring bracket plate 48 fixedly secured to the rear portion 20 of the tractor frame and having a transversely extending bar or spring bracket 50 extending laterally outwardly from the tractor and serving as a base for attachment of the springs 46 thereto. The springs 46 are secured to the spring bracket 50 by means of forwardly extending transversely spaced bolts or pins 52, FIG. 4, extending forwardly from the spring bracket 50 and having a threaded portion 53 thereon threadedly receiving spring adjusting means comprising a nut 54 and a spring holder 56 conventionally positioned within a first end 57 of each spring proximate the spring bracket 50.

The springs 46 have a hooked second end 58, FIG. 4, connected by a pin or spring connecting member 60 which extends transverse the springs. The spring bolts 52 supporting the springs for longitudinal movement do not extend forwardly for the full length of the springs but rather are fixedly connected to the first ends 57 of the springs preventing the first ends 57 of the springs from moving forwardly toward the tractor front end but not preventing a forward longitudinal stretching movement of the springs.

The weight transfer device 14 includes a swinging link arm 62 having a first end 64 pivotally connected to the tractor rockshaft 32 for rotation freely about the rockshaft and having a notched second end 66 with a notch 68 positioned facing forwardly of the tractor and being adapted to fit about the spring connecting memebr 60 to effect a forward stretching movement of the pair of springs upon clockwise movement of the link arm 62 from its substantially vertical depending position as illustrated in full line in FIG. 4. To effect such forward movement or clockwise rotation of the swinging link arm 62 to a position more forwardly disposed from the spring bracket 50 as indicated in dotted line in FIG. 4, rockshaft lever arm means 70 are provided constrained for movement with the rockshaft arm 34 through an arc of the same magnitude as the rockshaft arm, the lever arm means 70 being adapted to effect a forward movement of the swinging link arm 62 and the springs 46 upon movement of the rockshaft arm 34 in a clockwise direction as viewed in the drawings to a predetermined position.

The lever arm means includes first and second transversely spaced rearwardly extending lever arms 76, 77. The lever arms 76, 77 are fixedly secured together at first ends 78, 79 to form a generally U-shaped lever which is pivotally mounted on the tractor rockshaft and constrained for rotational movement coaxially with the rockshaft and lift arm 34, being secured to lift arm 34 for rotation therewith through an arc of the same magnitude by means of a spring arm plate 82 which is fixedly secured to the lever arm means as by welding to the first end 79 of lever arm 77 and which is secured to the rockshaft arm 34 along with a stop arm 84 by means of bolts 86 extending through upper and lower sets of openings 88 and 90, FIG. 3, provided for this purpose in the spring arm plate 82 and stop arm 84 on either side of the rockshaft arm 34. In other words the spring arm plate and stop arm 84 straddle the rockshaft arm and are bolted securely about the rockshaft arm. Stop arm 84 extends rearwardly of the tractor in generally the same direction as the lever arms 76, 77. The lever arms 76, 77 have second ends 92, 94 with an opening therein for receipt of a connecting member or pin 96 which is secured therein as by a cotter pin 98.

Referring now to FIGS. 4 and 5, the lever arms 76, 77, 78 straddling swinging link arm 62 and rotation of the lever arms 76, 77 in a clockwise direction to a predetermined position, shown in full line in FIG. 4, causes the connecting pin 96 to encounter the swinging link arm 62 to effect a forward rotation or forward movement of the swinging link arm to a predetermined second or stop position shown in dotted line in FIG. 4 just prior to such stop position. Forward movement of the link arm 62 effects a stretching of the springs and a transfer of a portion of the weight of an associated implement supported by support arms 26 and rockshaft arm 34. The weight of the implement 30 with the implement in a lowered position as shown in FIGS. 1 and 6 with the springs extended is transferred rearwardly through the springs, the spring bracket 50 and plate 48 to the tractor at a position over the rear drive wheels 24 effecting an increased loading of the drive wheels of the tractor and a corresponding increased tractive effort.

Means are provided for the operator to effect a simple adjustment in the range of operation of the weight transfer device, that is, the point at which weight transfer becomes effective, this means comprising the two pairs of bolt openings 88, 90 in upper plate 82 and stop arm 84. An upper operating range suitable for operations where an agricultural implement is to run at approximately the same level as the tractor wheels is obtained by utilizing the upper openings 88, as illustrated in FIG. 3, that is, clamping or bolting the spring arm plate 82 and stop arm 84 to the rockshaft arm using the upper openings 88. A lower operating range to permit the implement to run at a relatively lower level than the tractor wheels is achieved by clamping the plate 82 and stop arm 84 about the lift arm 34 utilizing the lower openings 90.

Means are provided to limit the range of operation of the weight transfer device and to prevent stretching of the springs beyond a predetermined point. This means comprises the stop arm 84 which has a free end 102 which is adapted to encounter an outwardly extending web 104 of spring bracket 48 (which joins the arm 50 to the bracket 48) when the rockshaft arm and stop arm have rotated to a predetermined position. Thus, the lowest point in the range of operation of the agricultural implement will be determined by the limit stop; however, in practice this stop is not permitted to ride on the web 104 and where this occurs the lift link arms 40 may be slightly lengthened by use of a conventional adjusting crank arm 106 and adjusting mechanism 108 to prevent the stop arm from riding on the web 104.

Having now described the invention, its manner of operation should be clear. However, for purposes of an easier understanding thereof its manner of operation will be briefly restated.

The weight transfer device of the present invention includes resilient spring means secured to a rear portion of the tractor at a position over the rear drive wheels thereof and extending forwardly, thus being adapted to be stretched in a forward direction. Lever arm means are provided to effect such forward stretching of the springs and includes a pair of lever arms 76, 77 secured to the tractor lift arm and being constrained for rotation simultaneously with the lift arm through an arc of the same magnitude, the lever arms being adapted upon rotation to a predetermined position to encounter swinging link arm 62 connected to the forward end 58 of the springs.

Thus, to lower an associated agricultural implement 30, an operator of the tractor effects rotation of the rockshaft 32 and rockshaft arms 34 through conventional hydraulic means illustrated in FIG. 6 including an engine operated pump 110, a fluid reservoir 112, a control valve 114 and a hydraulic cylinder 116 having a piston arm 118 connected to the rockshaft 32 to effect its rotation. Rotation of rockshaft 32 in a clockwise direction effects rotation of the lever arms 76, 77 with the rockshaft in a clockwise direction to a predetermined point where the lever arms 76, 77 encounter the link arm 62 connected to the springs. Further lowering of the implement or rotation of the rockshaft arms beyond this predetermined point effects a gradual transfer of weight of the implement 30, FIG. 6, to the tractor body through the springs and spring bracket 48.

Since modifications of the details of the structure as illustrated in various figures are contemplated, the invention should be limited only by the scope of the appended claims.

The invention is claimed as follows:

1. A hitch assembly for an implement and tractor, said tractor including a longitudinally extending body having front and rear portions, ground-engaging drive members supporting the rear portion of said tractor body, a rotatable rockshaft connected to said implement and being mounted for rotation along an axis transverse the body at a rear portion thereof, means to rotate said rockshaft to raise and lower said implement, said hitch assembly comprising:

implement support means pivotally mounted on the rear portion of said body, and extending rearwardly of said tractor, said implement being connected to said support means, lift means having first and second ends and being secured to said rockshaft at said first ends for rotation therewith, said lift means extending rearwardly, link means connected pivotally between said lift means second end and said support means whereby said support means and implement are raised upon rotation of said rockshaft in a first direction and said support means and implement are lowered upon rotation of said rockshaft in a second direction;

and resilient means secured to a rear portion of said tractor body and arranged to oppose rotation of said lift means beyond a predetermined position in said second direction, whereby upon rotation of said lift means in lowering said implement beyond said predetermined point, a portion of the weight of said implement is transferred to said tractor at a position over the rear drive members thereof.

2. A hitch assembly for an implement and tractor, said tractor including a longitudinally extending body having front and rear portions, ground-engaging drive members supporting the rear portion of said tractor body, a rotatable rockshaft connected to said implement end being mounted for rotation about an axis transverse the body at a rear portion thereof, means to rotate said rockshaft to raise and lower said implement, said hitch assembly comprising:

implement support means pivotally mounted on the rear portion of said body, and extending rearwardly of said tractor, said implement being connected to said support means, lift means having first and second ends and being connected to said rockshaft at said first ends for rotation therewith, said lift means extending rearwardly, link means connected pivotally between said lift means second end and said support means whereby said support means and implement are raised upon rotation of said rockshaft in a first direction and said support means and implement are lowered upon rotation of said rockshaft in a second direction;

swinging link means having first and second ends, said first ends being pivotally connected to said rockshaft for free rotation thereabout, said second ends depending from said rockshaft;

spring means having first and second ends, said first ends being connected to said second ends of said swinging link means, said second ends of said spring means being secured to said tractor body rearwardly of said swinging link means;

and lever arm means being secured to said lift means for rotation therewith, said lever arm means having free ends adapted to encounter said swinging link means at a predetermined position of rotation of said lift means in said first direction to expand said spring means connected thereto.

3. The hitch assembly of claim 2 including stop means secured to said lift means to prevent rotation of said lift means in said first direction at a predetermined second position beyond said first position of rotation.

4. In a hitch assembly for a tractor and an associated implement including hitch link means supportingly connected to said implement; and lift means on said tractor for raising and lowering said hitch links, said lift means being rotatable in a first direction to lower said hitch links and in a second direction to raise said hitch links, the combination therewith comprising:

a lever arm connected to said lift means for rotation therewith in first and second directions through arcs of the same magnitude as said lift means;

and resilient means secured to a rear portion of said tractor and arranged to resiliently oppose the rotation of said lever arm beyond a predetermined point in said first direction, whereby upon lowering said implement beyond said predetermined point, said resilient means opposes lowering thereof and a portion of the weight of said implement is transferred from said implement to said tractor.

5. A hitch assembly for a tractor and implement, said tractor including a body having front and rear portions, ground-engaging rotating members supporting said tractor including drive members supporting said tractor body at a rear portion thereof, a rotatable rockshaft mounted on said tractor and extending transversely thereof, means to rotate said rockshaft to raise or lower said implement;

implement support means having first and second ends and being pivotally connected at said first ends to said rear portion of said tractor; said support means extending rearwardly of said tractor, said second ends of said support means being pivotally connected to said implement;

rockshaft lift means being pivotally connected to said rockshaft for rotation therewith, link means pivotally connecting said rockshaft lift means and said implement support means, said lift means being rotatable in a first direction to lower said implement and in a second direction to raise said implement, lever arm means secured to said lift means for rotation therewith, said lever arm means moving with said rockshaft lift means through an arc of the same magnitude as said lift means, said lever arm means including a pair of transversely spaced lever arms being connected at first ends to said rockshaft, said lever arms depending from said tractor rockshaft, a transversely extending member connecting said pair of lever arms at second ends thereof, a link arm pivotally connected to said rockshaft and positioned for movement between said pair of lever arms, resilient means reactively disposed between said tractor body and said link arm, said transversely extending member of said lever arms being adapted upon rotation of said lever arms beyond a predetermined point in said first direction to encounter said link arm and to rotate said link arm therewith, said resilient means being positioned to oppose said rotation of said link arm beyond said predetermined point of rotation of said lever arms whereupon a portion of the weight of said implement is transferred to said tractor.

6. A hitch assembly for a tractor and associated implement, said tractor including a body, said body having a front end and a rear end, ground-engaging drive members supporting said body at said rear end thereof, a rockshaft mounted for rotation on the rear of said tractor body, said rockshaft extending transverse said tractor body, hydraulic means to rotate said rockshaft in first and second directions, said hitch assembly comprising:

implement supporting means having first and second ends and being pivotally mounted at said first ends on the rear portion of said body extending rearwardly of said tractor, said implement supporting means being connected at said second ends to said implement;

lift means to raise and lower said implement, said lift means including lift arms connected to said rockshaft and constrained for rotation therewith in first and second directions to lower and raise said implement, said lift arms extending generally rearwardly of said rockshaft, and link means pivotally connecting said lift arms and said implement support means; and resilient means on said tractor arranged to oppose the rotation of said lift means beyond a predetermined point in said first direction, whereby upon lowering of said implement beyond said predetermined point, a portion of the weight of said implement is transferred to the rear portion of said tractor.

7. A hitch assembly for a tractor and an associated implement, said tractor including a body having front and rear portions, ground-engaging rotatable drive members supporting the rear portion of said tractor, a rotatable rockshaft mounted for rotation on the rear portion of said tractor, said rockshaft extending transverse said tractor body;

a pair of transversely spaced rearwardly extending implement supporting members having first and second ends, said first ends of said members being pivotally mounted on the rear portion of said body, said second ends of said members being connected to said implement; a pair of rotatable rockshaft arms, said rockshaft arms being transversely spaced and secured to said rockshaft for rotation therewith in first and second directions respectively for lowering and raising said implement supporting members, link arms connecting said second ends of said rockshaft arms to said second ends of said implement supporting members for raising and lowering said implement supporting members;

rearwardly extending lever arms having first and second ends, said lever arms extending rearwardly of said tractor body and being secured to said rockshaft arms for rotation therewith through an arc of the same magnitude as said rockshaft arms;

a spring arm pivotally connected to said tractor coaxially with said rockshaft arms and depending from said tractor in a free swinging manner;

spring means having forward and rear ends, said rear ends being connected to said tractor body at a rear portion thereof, said spring means extending generally forwardly of said tractor body, said spring arm being adapted to contact said spring means and to stretch said spring means upon movement of said spring arm in a first direction beyond a predetermined position; means on said lever rockshaft arm to rotate said spring means in said first direction beyond said predetermined position; and stop means secured to said lever arm adapted to encounter said tractor body when said rockshaft arm has moved in said first direction to a second predetermined position to prevent further rotation of said rockshaft arm in said first direction tending to stretch said spring and lower said implement.

8. A hitch assembly for a tractor and implement, said tractor having a body having front and rear portions, rotatable ground-engaging members supporting said tractor body including a pair of ground-engaging drive members supporting the rear portion of said tractor, a transversely extending rockshaft mounted for rotation on said tractor, means to rotate said rockshaft, said hitch assembly comprising:

implement supporting means having first and second ends, said first ends being pivotally mounted on the rear portion of said tractor body, said second ends being connected to an implement;

a rearwardly extending rockshaft arm having first and second ends and being secured to said rockshaft at said first end for rotation therewith, said rockshaft arm second end being linked pivotally to said implement supporting means for lowering and raising said supporting means upon rotation of said rockshaft in first and second directions respectively;

first and second transversely spaced rearwardly extending lever arms having first and second ends, said first ends being pivotally connected to said tractor coaxially with said rockshaft arm, said lever arms being secured to said rockshaft arm for rotation therewith through an arc of the same magnitude, a connecting member joining said second ends of said first and second lever arms, said connecting member extending in a direction transverse said tractor body; a link arm having first and second ends and being pivotally connected at said first end to said tractor for rotation coaxially with said rockshaft arm, said link arm being positioned between said first and second lever arms and depending from said tractor, said connecting member being adapted to encounter said link arm and tending to rotate said link arm when said lever arms have rotated in said first direction to a first predetermined position, transversely spaced, first and second coil springs having first and second ends spring mounting means on said tractor rear portion and extending transverse said tractor, said first ends of said coil springs being connected to said mounting means and being adapted for stretching movement in a direction forwardly of said mounting means; a spring connecting member extending transversely and joining said second ends of said springs, said link arm having a notch at said second end adapted to fit about said spring connecting member to stretch said spring upon movement of said link arm forwardly in said first direction, whereupon rotational movement of said rockshaft arm in said first direction to lower said implement beyond said predetermined position moves said lever arm forwardly to stretch said coil springs and to effect a transfer of weight from said implement to said tractor at a position proximate said spring mounting means.

9. A hitch assembly for a tractor and associated implement comprising: hitch arms pivotally connected at one end to said tractor and being pivotally connected to said implement at said other ends; rotatable lift means to raise and lower said hitch arms and implement connected thereto, said lift means being rotatable in a first direction to lower said implement and being rotatable in a second direction to raise said implement; and resilient means on said tractor adapted to oppose rotation of said lift means beyond a predetermined point in said first direction whereupon rotation of said lift means in said first direction to lower said implement beyond said predetermined point effects a transfer of weight of said implement to said tractor.

10. A weight transfer device for a vehicle and associated implement to be raised and lowered, said vehicle including a body having first and second ends, ground-engaging drive members supporting at least one of said ends, a rotatable shaft being mounted for rotation on said vehicle, implement support means pivotally mounted on said body and extending outwardly from said vehicle, said implement being connected to said support means, lift means having first and second ends and being connected to said shaft at said first ends for rotation therewith, said lift means extending outwardly from said vehicle in the same direction as said implement support means, link means connected pivotally between said lift means second end and said support means whereby said support means and implement are raised upon rotation of said shaft in a first direction and said support means and implement are lowered upon rotation of said shaft in a second direction, means to rotate said shaft to raise and lower said implement, said weight transfer device comprising: the combination therewith of resilient means secured to said vehicle body and arranged cooperably between said lift means and said tractor to oppose rotation of said lift means beyond a predetermined point in said second direction, whereby upon rotation of said lift means in lowering said implement beyond said predetermined point, a portion of the weight of said implement is transferred to said vehicle at a position over the drive members thereof.

11. A weight transfer device for a vehicle and associated implement to transfer a portion of the weight of said implement to said vehicle over its drive wheels, said vehicle including a longitudinally extending body having first and second ends, ground-engaging drive members supporting at least one of said ends, a rotatable rockshaft connected to said implement and being mounted for rotation about an axis transverse the body, means to rotate said rockshaft to raise and lower said implement;

implement support means pivotally mounted on said body, and extending longitudinally outwardly of said vehicle, said implement being connected to said support means, lift means having first and second ends and being connected to said rockshaft at said first ends for rotation therewith, said lift means extending longitudinally outwardly of said vehicle, link means connected pivotally between said lift means second end and said support means whereby said support means and implement are raised upon rotation of said rockshaft in a first direction and said support means and implement are lowered upon rotation of said rockshaft in a second direction, the combination therewith comprising:

swinging link means having first and second ends, said first ends being pivotally connected to said rockshaft for free rotation thereabout, said second ends depending from said rockshaft;

spring means having first and second ends, said first ends being connected to said second ends of said swinging link means, said second ends of said spring means being secured to said tractor body rearwardly of said swinging link means;

and lever arm means being secured to said lift means for rotation therewith, said lever arm means having free ends adapted to encounter said swinging link means at a first predetermined position of rotation of said lift means in said first direction to expand said spring means connected thereto and to transfer a portion of the weight of said implement to said vehicle.

12. The weight transfer device of claim 11 including stop means secured to said lift means and cooperative between said lift means and said tractor to prevent rotation of said lift means in said first direction at a predetermined position beyond said first position of rotation.

References Cited

UNITED STATES PATENTS

| | | | |
|---|---|---|---|
| 2,800,341 | 7/1957 | Gaines | 280—489 |
| 3,182,730 | 5/1965 | Murphy | 172—445 X |
| 3,198,261 | 8/1965 | Clarke | 172—9 |

FOREIGN PATENTS

| | | |
|---|---|---|
| 1,105,666 | 12/1955 | France. |

ABRAHAM G. STONE, *Primary Examiner.*

J. R. OAKS, *Assistant Examiner.*